Sept. 15, 1970          R. J. LOHR ET AL          3,528,682
                    STEERING DEVICE FOR VEHICLES
Filed May 14, 1968                              5 Sheets-Sheet 3
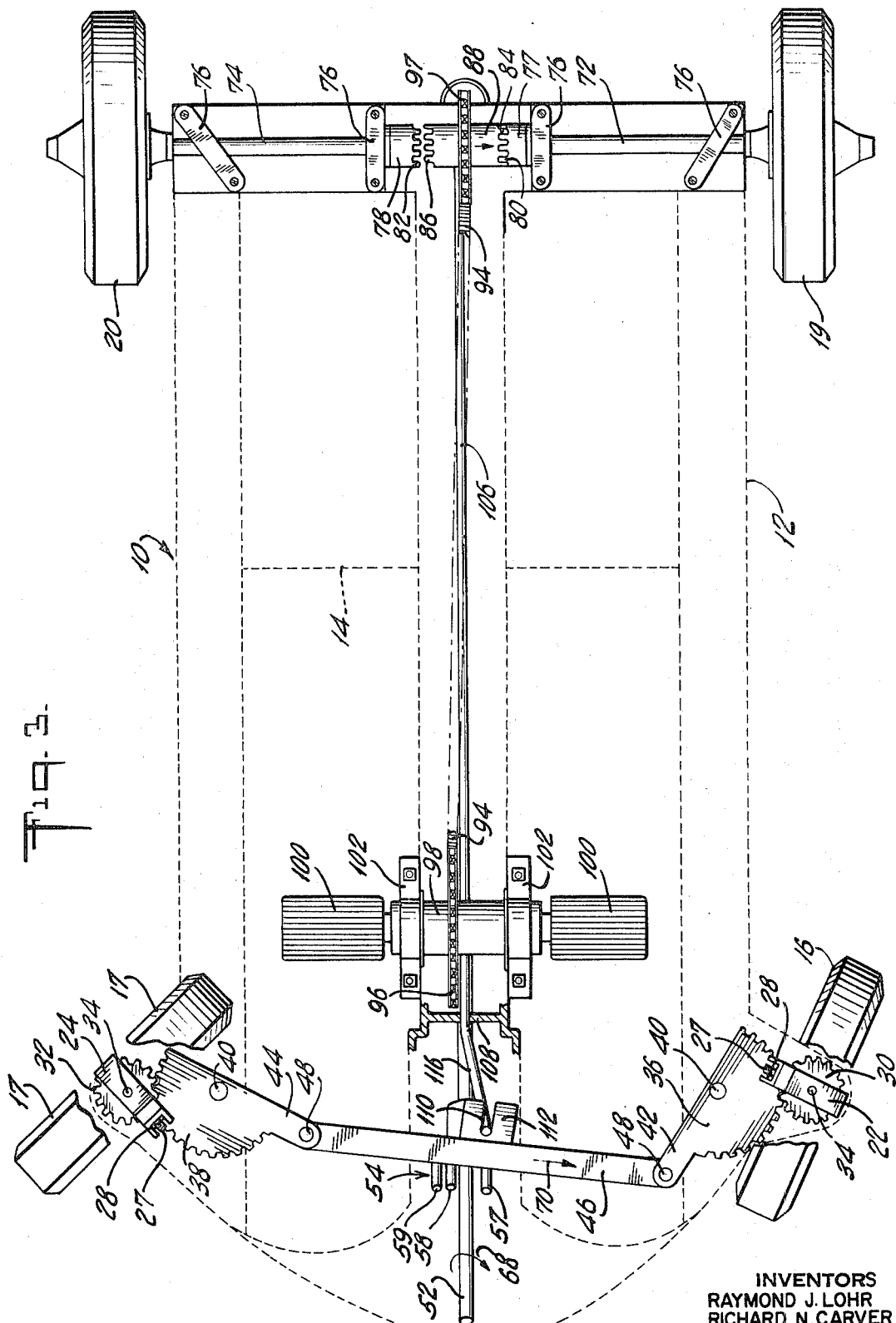
INVENTORS
RAYMOND J. LOHR
RICHARD N. CARVER
BY CHARLES M. KIENHOLZ
ATTORNEYS Sept. 15, 1970  R. J. LOHR ET AL  3,528,682
STEERING DEVICE FOR VEHICLES
Filed May 14, 1968  5 Sheets-Sheet 4
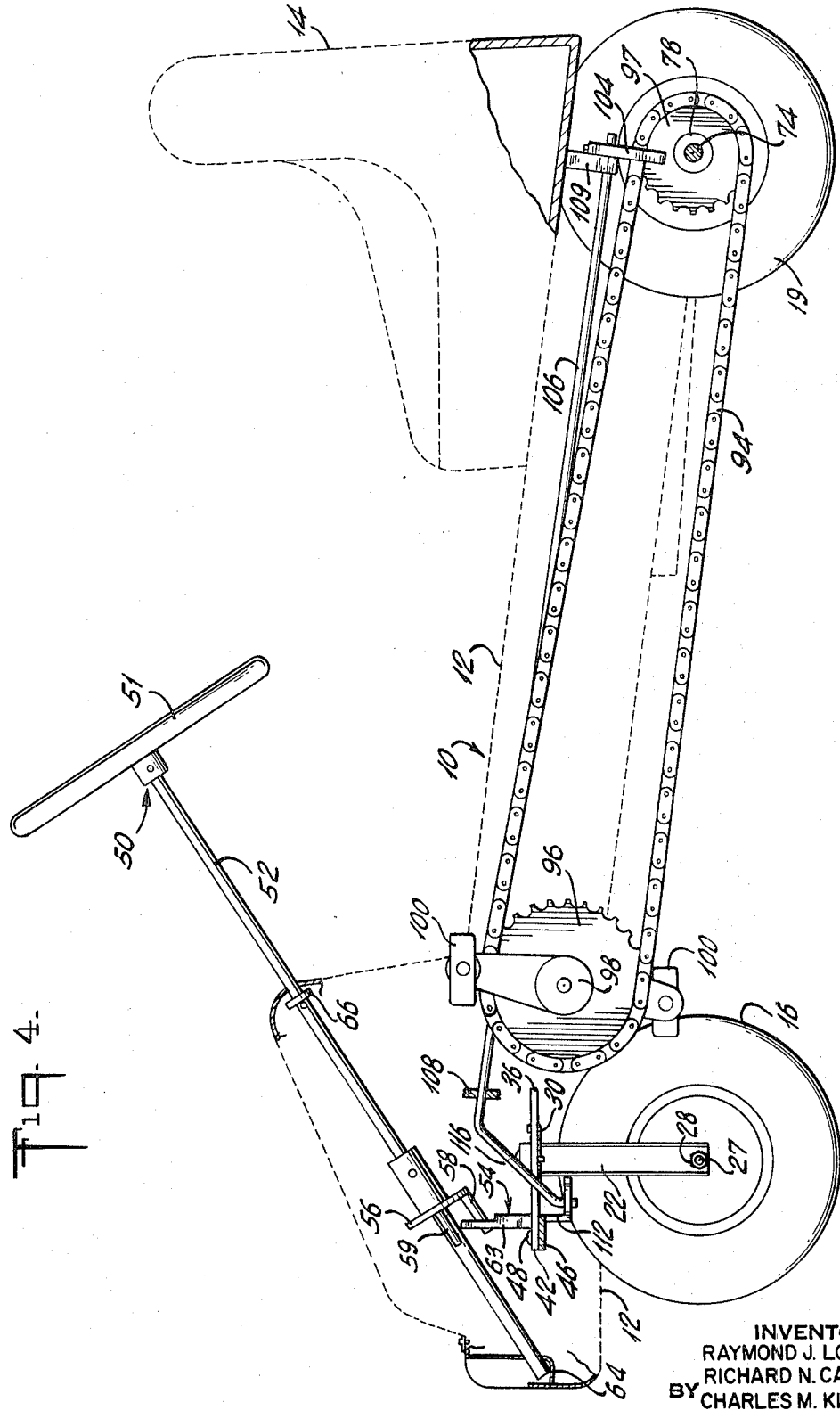
INVENTORS
RAYMOND J. LOHR
RICHARD N. CARVER
CHARLES M. KIENHOLZ
BY Blum, Moscovitz, Friedman, Blum & Kaplan
ATTORNEYS

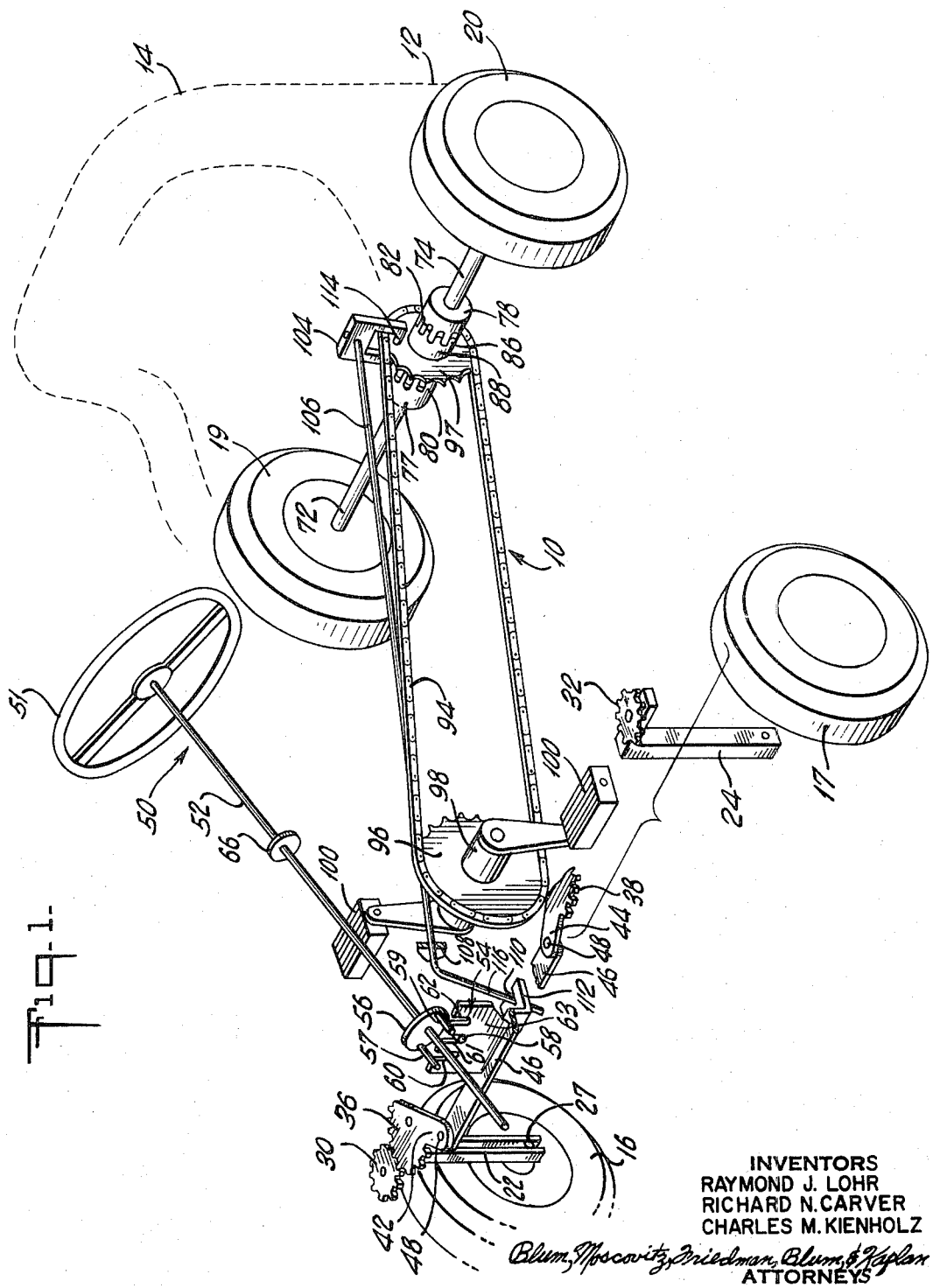

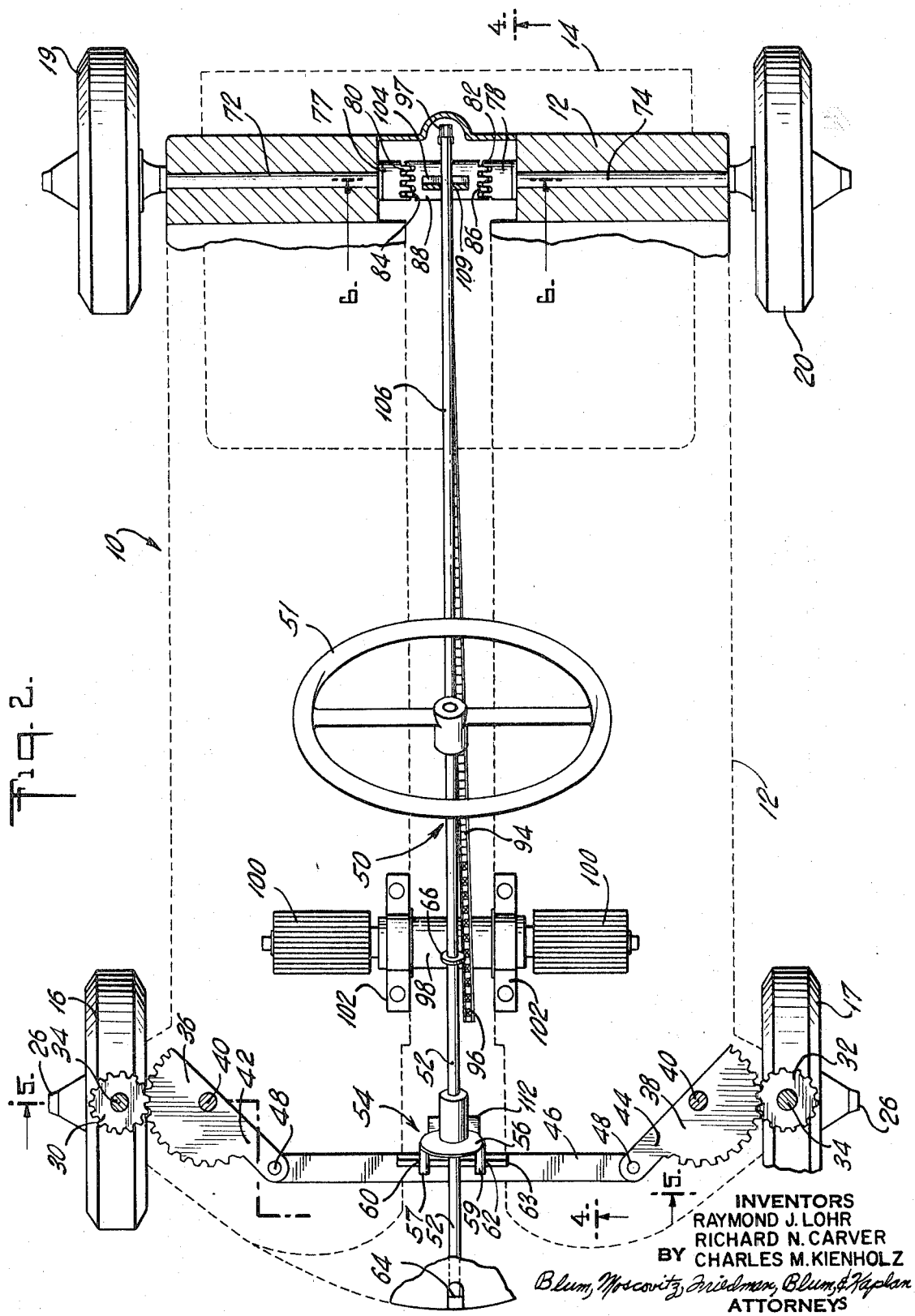

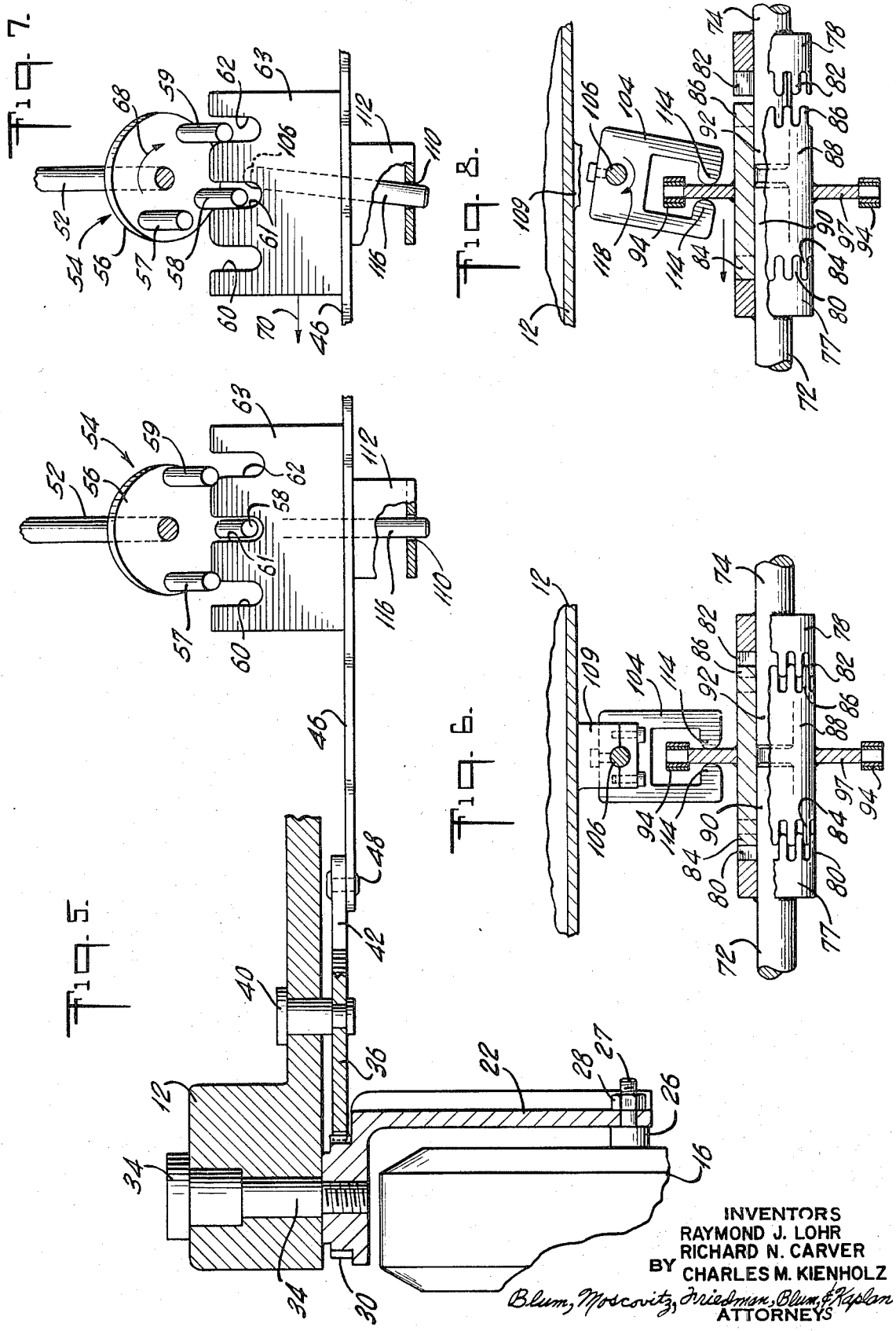

United States Patent Office 3,528,682
Patented Sept. 15, 1970

3,528,682
STEERING DEVICE FOR VEHICLES
Raymond J. Lohr, Richard N. Carver, and Charles M. Kienholz, Erie, Pa., assignors to Louis Marx & Co., Inc., New York, N.Y., a corporation of New York
Filed May 14, 1968, Ser. No. 729,082
Int. Cl. B62d 7/14
U.S. Cl. 280—211      9 Claims

ABSTRACT OF THE DISCLOSURE

A steering device for vehicles including a driving member slidably and rotatably mounted on the inner ends of a pair of spaced, axially aligned axles, each carrying at least one driving wheel at its outer end, said driving member being displaced in response to the movement of the steering means, into and out of engagement with both, one or the other of a pair of driven members. Each of the driven members are fixedly secured to one of the axles and adapted to be rotated when engaged by the driving member, so that only the driving wheel on the outside of a sharp turn is driven during such turn while both driving wheels are driven when such vehicle is proceeding along a substantially straight line. The device also includes a steering wheel linkage having a pair of first gear means each adapted to rotate at least one steering wheel and support therefor about a substantially vertical axis, a central link, a pair of pivot arms each hangedly secured at one end to one end of the link and a pair of second gear means each fixedly secured to the other end of one of said pivot arms and operatively engaging one of said first gear means. The link is displaced in response to the movement of the steering means whereby the steering wheel on the inside of the turn is rotated about said vertical axis over a greater angle than the other of said steering wheels.

BACKGROUND OF THE INVENTION

This invention relates generally to steering devices for vehicles. It is frequently desirable to minimize the turning radius of a vehicle due to the restricted area in which it is required to operate. This is particularly true in the case of toy vehicles which may be utilized indoors or in other confined spaces. Further, an ability to "turn on a dime" greatly enhances the play value of a toy vehicle.

Two factors which tend to increase the radius of turn of a vehicle are the slipping and frictional resistance of the steering wheels and the force applied by the driving wheel on the inside of the turn when continuously driven which tends to resist the turn. By minimizing the former factor and eliminating the latter factor, a substantially shorter radius of turn has resulted.

SUMMARY OF THE INVENTION

Generally speaking, in accordance with the invention, a steering device for vehicles is provided which includes a pair of axles substantially aligned in spaced relation on a single axis and having at least one driving wheel fixedly attached to each of the outer ends thereof, a driving member operatively connected to a driving means and mounted on the inner ends of the axles for rotational and axial movement thereon, and a pair of driven members each fixedly secured to one of the axles and adapted to be rotated when engaged by the driving member to drive its respective driving wheel. The driven members are spaced to permit the driving member to be axially displaced in response to the movement of a steering means into and out of engagement with both, one or the other of the driven members, so that only the driving wheel on the outside of a relatively sharp turn is driven during such turn while both of said driving wheels are driven when said vehicle is proceeding along a substantially straight line. The driving member is preferably formed with a plurality of spaced teeth extending axially from both ends thereof and adapted to mesh with corresponding teeth extending axially from the inner ends of each of said driven members.

A further feature of the steering device according to the invention is a steering linkage adapted to rotate each of the steering wheels of a vehicle about a substantially vertical axis. The linkage includes a pair of spaced supports each having at least one of said steering wheels rotatably mounted thereon, a first gear means mounted on each of said supports for rotation thereof, a link disposed between the supports, a pair of lever arms each being at one end hingedly connected to one end of the link and a pair of second gear means each fixedly connected to the other end of one of said lever arms and to operatively engaging the first gear means. This feature permits the steering wheel on the side of the turn to be rotated about said vertical axis over a greater angle than the other steering wheel to minimize slipping and frictional resistance to the turn. When the steering wheels are disposed to direct the vehicle in a substantially straight line of travel, the link is preferably disposed substantially normal to the line of travel while each of the lever arms defines an oblique angle with the link. The first gear means is preferably a spur gear while the second gear means is preferably a sector gear of a radius greater than the radius of the first gear means.

Accordingly, it is an object of this invention to provide a steering mechanism for vehicles which will minimize the radius of turn of said vehicles.

Another object of the invention is to provide a steering device for vehicles wherein only the driving wheel on the outside of a relatively sharp turn is driven during such a turn while both of the driving wheels are driven when said vehicle is proceeding along a substantially straight line.

A further object of the invention is to provide a steering device for vehicles wherein the steering wheel on the inside of the turn is rotated about a vertical axis over a greater angle than the other of the steering wheels to minimize slipping and frictional resistance to a turn.

Still another object of the invention is to provide a steering device for vehicles particularly adapted to toy vehicles.

Still other objects and advantages of the invention will in part be obvious and will in part be apparent from the specification. The invention accordingly comprises the features of construction, combinations of elements, and arrangements of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings in which:

FIG. 1 is a perspective view of a steering device for a vehicle constructed in accordance with the invention with portions exploded;

FIG. 2 is a top plan view of the steering device for the vehicle of FIG. 1 with portions of the body of said vehicle shown in phantom or broken away;

FIG. 3 is a bottom plan view of the steering device for the vehicle of FIG. 2 in a moved position;

FIG. 4 is a sectional view taken along lines 4—4 of FIG. 2;

FIG. 5 is an enlarged sectional view taken along line 5—5 of FIG. 2;

FIG. 6 is an enlarged sectional view taken along line 6—6 of FIG. 2;

FIG. 7 is an enlarged partial sectional view taken along lines 5—5 of FIG. 2; and FIG. 8 is a sectional view taken along lines 6—6 in a moved position.

DESCRIPTION OF THE PREFERRED EMBODIMENT

Referring now more particularly to the drawings, the vehicle 10 depicted includes a steering device according to the invention mounted on a frame 12 shown generally in phantom. Mounted on frame 12 is seat 14 also shown generally in phantom. The vehicle rides on four wheels, two spaced steering wheels 16 and 17 disposed at the front of the vehicle and two spaced driving wheels 19 and 20 disposed at its rear.

One feature of the steering device according to the invention is directed to the control of steering wheels 16 and 17. Said steering wheels are rotatably mounted on stub axles 26 which are secured to supports 22 and 24 by means of bolts 27 and nuts 28. Fixedly secured to the top of the shorter leg of supports 22 and 24 respectively are first spur gears 30 and 32. Each pin 34 is journaled through frame 12 and secured to one of supports 22 and 24. This arrangement permits wheel 16 and support 22 to rotate about a substantially vertical axis defined by pin 34 when first gear 30 is rotated about said axis. Wheel 18, support 24 and first gear 32 function in a like manner.

Operatively engaging first gears 30 and 32 are second or sector gears 36 and 38. If desired, second gears 36 and 38 could be formed from complete spur gears. Second gears 36 and 38 are each rotatably mounted on frame 12 by means of pins 40. The radius of said second gears is preferably greater than the radius of first gears 30 and 32 so that a short rotational displacement of said second gears results in the displacement of said first gears over a relatively larger angle. Integrally formed with each of the second gears 36 and 38 are lever arms 42 and 44, respectively, which are adapted to rotate said gears about the axis formed by pins 40. Lever arms 42 and 44 could be formed from separate members fixedly attached to second gears 36 and 38. Link 46 is hingedly secured at its ends to one end of lever arms 42 and 44 by means of rivets 48.

Link 46 is displaced in response to the movement of the vehicle steering means shown generally at 50, which consists of wheel 51 and steering shaft 52. The steering shaft rests on frame 12 at socket 64 and is retained within said frame by ring 66. The movement of steering means 50 is transmitted to link 46 by coupling means 54. As shown in the drawings, coupling means 54 includes disc 56 fixedly secured to steering shaft 52, said shaft passing through a central aperture in said disc. Three fingers 57, 58 and 59 project from the face of said disc and are spaced along the periphery thereof. Said fingers are adapted to engage corresponding slots 60, 61 and 62 in upright member 63 which is fixedly attached to link 46.

The operation of coupling means 54 and the control of steering wheels 16 and 17 will be more clearly understood by reference to the drawings. FIGS. 2 and 5 show the steering mechanism according to the invention as it would be disposed if vehicle 10 were proceeding along a substantially straight line of travel. The steering wheels 16 and 17 are substantially parallel to that line of travel while link 46 is substantially normal thereto. Lever arms 42 and 44 each define an oblique angle with link 46.

FIGS. 3 and 7 show said steering device as it would be disposed if the vehicle were making a left turn. To effect such a turn, the driver would turn steering means 50 and therefor wheel 51 and steering shaft 52 in a counterclockwise direction, causing disc 56 to rotate in the direction of arrow 68. As said disc rotates, finger 58 engages against the side wall of slot 61 to displace link 46 in the direction of arrow 70. Simultaneously, finger 57 leaves slot 60 and finger 59 enters slot 62. As the disc 56 continues to rotate in response to the rotation of the steering means, finger 58 will leave slot 61 while finger 59 will engage the side wall of slot 62 to further propel link 46 in the direction of arrow 70. Second gears 36 and 38 are rotated in response to the displacement of link 46 by lever arms 42 and 44 respectively. These gears in turn rotate first spur gears 30 and 32 respectively which carry with them their corresponding support and wheel.

As shown in FIG. 3, steering wheel 17, the wheel on the inside of the turn, is rotated about a substantially vertical axis over a greater angle than steering wheel 16. Under ideal conditions, both steering wheels should continuously rotate about their respective stub axles 26. This occurs when the vertical plane defined by each steering wheel is substantially tangent to the arc defined by each of said wheels during a turn. However, the centers of said arcs substantially coincide, the turning radius of the steering wheel on the inside of the turn being substantially shorter than the turning radius of the other of said wheels. Were both of said wheels rotated an equal amount about their vertical axis during a turn, one or the other of said wheels must slip sideways to follow the turn, thereby increasing the frictional resistance to the turn and tending to increase the radius of turn. Accordingly, by rotating the steering wheel on the inside of the turn about a substantially vertical axis over a greater angle than the other of said steering wheels, frictional resistance to the turn and the turning radius are minimized.

If the steering means is turned in a clockwise direction, the steering device according to the invention operates in a like manner to turn the vehicle to the right, with steering wheel 16 being rotated about a substantially vertical axis over a greater angle than steering wheel 17.

The length of lever arms 42 and 44 and link 46 and the radius of first gears 30 and 32 and second gears 36 and 38 are preferably selected so that the above-described ideal conditions are substantially achieved when steering means 50 is disposed for the sharpest turn. During such a turn, the steering wheel on the inside of the turn would lie in a vertical plane nearly normal to the vertical plane defined by the substantially straight line of travel. The embodiment of coupling means 54 shown in the drawings could be replaced by a conventional rack and pinion arrangement. Further, the steering means could consist of a lever hingedly mounted on frame 12 and connected to link 46 to displace said link when moved to the left or right.

Another feature of the steering device according to the invention is adapted to drive both, one or the other of driving wheels 19 and 20 in response to the movement of the steering means. Referring to the drawings, driving wheels 19 and 20 are fixedly secured to the outer ends of a pair of axially aligned axles 72 and 74 respectively. Said axles are retained within a channel in frames 12 by retaining straps 76. Fixedly attached to axles 72 and 74 are substantially cylindrical driven members 77 and 78 respectively. Each of said driven members is formed with a plurality of teeth 80 and 82 extending axially from the periphery of one end thereof. Tubular driving member 88 is disposed between said driven members and is formed with a plurality of teeth 84 and 86 extending axially from the periphery of both ends thereof.

Driven member teeth 80 are adapted to mesh with driving member teeth 84 as are teeth 82 and 86. The inner ends 90 and 92 of axles 72 and 74 respectively extend into the central bore of driving member 88 and support said driving member for axial movement therealong and rotational movement thereabout.

The embodiment of the invention as shown in the drawings is driven by a conventional pedal operated chain drive. Chain 94 extends around sprocket wheels 96 and 97. Sprocket wheel 96 is secured to shaft 98 which is rotated in a conventional manner by pedals 100. Shaft 98 is secured to frame 12 by brackets 102. Driving member 88 extends through a central aperture in sprocket wheel 97 and is secured thereto for rotation thereby. In operation, pedals 100 would be rotated, thereby rotating driving member 88 by means of sprocket wheels 96 and 97 and chain 94.

Driving member 88 is axially displaced by U-shaped member 104 which is fixedly mounted on rod 106 for rocking thereby. Said rod is rotatably mounted on frame 12 at points 108 and 109. Rod 104 is bent substantially at about point 108 to define portion 116 which extends into slot 110 in guide 112. Said guide is fixedly mounted on link 46 and displaced therewith. Thus, rod 106 is rotated about its longitudinal axis in response to the displacement of link 46, which in turn is in response to the movement of steering means 50 as described above. U-shaped member 104 is provided with inwardly extending fingers 114 which engages sprocket wheel 97 to axially displace said sprocket wheel and driving member 88 when rod 106 is rotated.

The operation of the controls for driving wheels 19 and 20 is best understood by reference to the drawings. FIGS. 2, 5 and 6 show this feature of the steering device according to the invention as it would be disposed if vehicle 10 were proceeding along a substantially straight line of travel. The teeth 84 and 86 of driving member 88 are in meshing engagement with the corresponding teeth of both driven members 77 and 78 so that the driving force produced by the driving means is applied to both driving wheels 19 and 20.

FIGS. 3, 7 and 8 show said steering device as it would be disposed if the vehicle were making a left turn. As previously described, such a turn would be effected by turning wheel 51 and steering shaft 52 in a counter-clockwise direction, causing disc 56 and fingers 57 to rotate, whereby link 46 is displaced in the direction of arrow 70. Link 46 carries with it guide 112 and portion 116 of rod 106. The displacement of portion 116 turns the balance of rod 106 about its longitudinal axis which in turn rocks U-shaped member 104 in the direction of arrow 118 to displace driving member 88 out of engagement with driven member 78. In this position, the driving force is transmitted only to driving wheel 19, while driving wheel 20 is left free. By this arrangement, the vehicle is propelled solely by the driving wheel on the outside of the turn, thereby minimizing the radius of said turn. Driving wheel 20 is permitted to rotate freely so as not to cause frictional resistance to the turn.

In like manner, driving member 88 will be displaced out of engagement with driven member 77 and into meshing engagement with driven member 78 when the steering means is moved for a right turn. Driven members 77 and 78 are spaced to permit driving member 88 to be positioned in meshing engagement with either both, one or the other of said driving members.

A further feature of the steering mechanism according to the invention is the fact that rod 106 serves as a torsion bar to absorb the torque applied by the steering means through link 46, guide 112 and bent end 116 of said rod under certain circumstances. Thus, if the steering mechanism is disposed in the position for a left turn as shown in FIG. 8, and the driver desires to turn to the right or proceed along a straight line of travel, it would be necessary for teeth 86 of driving member 88 and teeth 82 of driven member 78 to mesh. However, if, when driving member 88 is displaced toward driven member 78, teeth 82 and 86 are not in meshing alignment, rod 106 will absorb the torque caused by the movement of steering means 50. The friction between driving wheel 20 and the ground will cause that driving wheel to rotate carrying with it driven member 78 until teeth 82 and 86 are in meshing engagement. At this point, said torque is applied to the driving member for the axial displacement thereof into meshing engagement with driven member 78.

While the embodiment of the invention shown in the drawings is driven by a pedal operated drive, a steering device according to the invention could also be used in a motor driven vehicle. The above-described simple, yet sturdy, construction is particularly adapted to the relatively low speeds and power encountered in toy vehicles but is not limited to such applications.

It will thus be seen that the objects set forth above, and those made apparent from the preceding description, are efficiently attained and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A steering device for vehicles comprising at least two driving wheels; a pair of axles substantially aligned in spaced relation on a single axis, said axles having inner and outer ends, at least one of said driving wheels being fixedly attached to each of said pair of axles at its outer end for rotation thereby; a driving member mounted on said axle inner ends for rotational and axial movement thereon; driving means operatively connected to said driving member; a pair of driven members each fixedly secured to one of said axles and adapted to be rotated when engaged by said driving member to drive its respective driving wheel; steering means; connecting means between said steering means and said driving member for axially displacing said driving member in response to the movement of said steering means, said driven members being spaced to permit said driving member to be displaced into and out of engagement with both, one or the other of said driven members; at least two steering wheels; a pair of spaced supports, at least one of said steering wheels being rotatably mounted on each of said supports; a pair of first gear means, one of said first gear means being fixedly attached to each of said supports and adapted to rotate said support and associated steering wheel about a substantially vertical axis; a link disposed between said supports; a pair of lever arms; a pair of second gear means, each of said second gear means being in operative engagement with one of said first gear means, each of said lever arms being, at one end, hingedly connected to one end of said link and, at the other end, fixedly connected to one of said second gear means; and coupling means between said steering means and said link for displacing said link in response to the movement of said steering means, whereby only the driving wheel on the outside of a relatively sharp turn is driven during such turn while both of said driving wheels are driven when said vehicle is proceeding along a substantially straight line of travel and the steering wheel on the inside of the turn is rotated about said substantially vertical axis over a greater angle than the other of said steering wheels to minimize slipping and frictional resistance to said turn.

2. A steering device for vehicles as recited in claim 1, wherein when said steering wheels are disposed to direct said vehicle in a substantially straight line of travel, said link is substantially normal to said line of travel and each of said lever arms define an oblique angle with said link, each of said first gear means being a spur gear, each of said second gear means being a sector gear of a radius greater than the radius of said first gear means.

3. A steering device for vehicles comprising at least two steering wheels; a pair of spaced supports, at least one of said steering wheels being rotatably mounted on each of said supports; a pair of first gear means, one of said first gear means being fixedly attached to each of said supports and adapted to rotate said support and associated steering wheel about a substantially vertical axis; a link disposed between said supports; a pair of lever arms; a pair of second gear means, each of said second gear means being in operative engagement with one of said first gear means, each of said lever arms being, at one end, hingedly connected to one end of said link and, at the other end, fixedly connected to one of said second gear means; steering means; and coupling means between said steering means and said link for displacing said link in response to the movement of said steering means, whereby the steering wheel on the inside of the turn is rotated about said substantially vertical axis over a greater angle than the other of said steering wheels to minimize slipping and frictional resistance to said turn.

4. A steering device for vehicles as recited in claim 3, wherein, when said steering wheels are disposed to direct said vehicle in a substantially straight line of travel, said link is substantially normal to said line of travel and each of said lever arms define an oblique angle with said link.

5. A steering device for vehicles as recited in claim 3, wherein each of said first gear means is a spur gear, each of said second gear means being a sector gear of a radius greater than the radius of said first gear means.

6. A steering device for vehicles as recited in claim 3, including driving means; at least two driving wheels; and means for operatively connecting said driving means to both, one or the other of said driving wheels for driving only the driving wheel on the outside of a relatively sharp turn during such turn and driving both of said driving wheels when said vehicle is proceeding along a substantially straight line of travel.

7. A steering device for vehicles comprising at least two driving wheels; a pair of axles substantially aligned in spaced relation on a single axis, said axles having inner and outer ends, at least one of said driving wheels being fixedly attached to each of said pair of axles at its outer end for rotation thereby; a driving member mounted on said axle inner ends for rotational and axial movement thereon, said driving member having a plurality of spaced teeth extending axially from both ends thereof; a pair of driven members each fixedly secured to one of said axles, each of said driven members having a plurality of spaced teeth extending axially from one end thereof toward said driving member, said driven member teeth being adapted to mesh with the corresponding driving member teeth for driving of said driven members and their respective driving wheels upon the meshing of said corresponding teeth of said driving and driven members; driving means operatively connected to said driving member; steering means; and connecting means between said steering means and said driving member for axially displacing said driving member in response to the movement of said steering means, said connecting means including a torsion bar, said steering means being adapted to impart a rotational torque to one end of said bar when effecting a turn of said vehicle, said torsion bar absorbing said torque until said driving member teeth and driven member teeth are in meshing alignment, at which point said torque is applied to said driving member for the axial displacement thereof into meshing engagement with said driven member, said driven members being spaced to permit said driving member to be displaced into and out of engagement with both, one or the other of said driven members, whereby only the driving wheel on the outside of a relatively sharp turn is driven during such turn while both of said driving wheels are driven when said vehicle is proceeding along a substantially straight line of travel.

8. A steering device for vehicles comprising a pair of driving wheels, means for selectively driving said driving wheels independently or conjointly including a driving member movable into and out of operative engagement with said driving wheels, vehicle steering means, and a torsion bar operatively connecting said vehicle steering means and said driving member for controlling the movement thereof and concomitantly the engagement of said driving wheels, said driving member being in operative engagement with both of said driving wheels in the straight line travel position of said steering means and in operative engagement with only one of said driving wheels in response to the predetermined travel of said steering means in a direction of turn opposite to said one driving wheel to thereby shorten the turning radius of the vehicle.

9. A steering device as recited in claim 8, including a plurality of spaced teeth associated with said driving wheels for the driving thereof, said driving member having a plurality of spaced teeth extending axially from both ends thereof adapted to mesh with the corresponding teeth associated with said driving wheels for the operative engagement of said driving member and driving wheels in the various positions thereof, said vehicle steering means being adapted to impart a rotational torque to one end of said bar when effecting a turn of said vehicle, said torsion bar absorbing said torque until said driving member teeth and the teeth associated with the respective driving wheels are in meshing alignment, at which point said torque is applied to said driving member for the displacement thereof into meshing engagement with said driving wheel teeth.

References Cited

UNITED STATES PATENTS

| 1,267,033 | 5/1918 | Wilson. | |
| 1,367,309 | 2/1921 | Dunham | 180—6.34 |
| 1,748,061 | 2/1930 | Claude | 280—93 |
| 2,529,967 | 11/1950 | Rozwood | 180—6.32 |
| 2,916,294 | 12/1959 | Quayle | 280—93 |

KENNETH H. BETTS, Primary Examiner

U.S. Cl. X.R.

180—6.24; 280—96, 269